Patented Sept. 4, 1951

2,566,336

UNITED STATES PATENT OFFICE 2,566,336

PREPARATION OF KETO-AMINE SALTS IN THE STEROID SERIES AND PRODUCTS

Percy L. Julian, Maywood, and Edwin W. Meyer and John W. Cole, Chicago, and Arthur Magnani, Wilmette, Ill., assignors to The Glidden Company, Cleveland, Ohio, a corporation of Ohio No Drawing. Application August 28, 1947, Serial No. 771,136

25 Claims. (Cl. 260—397.3)

The present invention relates to the preparation of keto-amine salts of the steroid series and to certain intermediates in their preparation. More particularly the invention relates to such compounds in which the amine group is attached either directly to the 17-carbon atom of the steroid nucleus or contained in a side chain attached to the 17-carbon atom of the steroid nucleus.

Such amines are valuable intermediates in the preparation of known compounds possessing physiological activity and as possible therapeutic agents themselves.

Several attempts to isolate and purify such keto-amines by the methods described in the literature have shown that these amines have a strong tendency to pass over into amorphous insoluble condensation products. Due to this fact none of these keto-amines has heretofore been isolated as pure compounds and characterized. It is believed that these condensations result from reaction between the keto-group of one molecule and the amine group of another molecule. These amorphous products cannot be purified by recrystallization, and further reactions are impractical because of their insolubility and lack of purity.

It is accordingly an object of the present invention to accomplish the purification of such keto-amines in the form of suitable derivatives.

Another object of the invention is to provide an improved process for preparing keto-amine salts in the steroid series.

An additional object is to provide new derivatives of keto-amines in the steroid series useful in accomplishing the foregoing objects.

Other objects will be apparent to those skilled in the art from the following description.

The realization of these objects involves preparing the desired derivatives of the keto-amines indirectly without passing through the unworkable free keto-amines. This has been accomplished by (1) condensing the corresponding hydroxy-amines with aromatic aldehydes to form Schiff's bases, (2) oxidizing the hydroxy-Schiff's bases to the keto-Schiff's bases, and then (3) hydrolyzing the Schiff's bases to the keto-amine salts, with or without purification of the keto-Schiff's bases.

The employment of the hydroxy-Schiff's bases offers two advantages. First, they are easily crystallizable substances and result in effecting a purification of the hydroxy-amines. Secondly, during the oxidation the keto-Schiff's bases which are formed are stable and do not lead to the amorphous condensation products characteristic of the free keto-amine. Furthermore, the resulting keto-Schiff's bases are easily crystallizable substances which make possible a practical separation and purification of the products. It has proved to be advantageous to purify the keto-Schiff's bases before hydrolysis to the pure keto-amine sales, rather than to attempt a purification of the salts. Many of the latter are hygroscopic water-soluble substances which, although they are crystalline products, do not readily lend themselves to purification by recrystallization.

The hydrolysis of the purified keto-Schiff's bases comprises heating them with aqueous acid with subsequent removal of the liberated aldehyde by either steam distillation or by solvent extraction. The solution of the amine salt may be evaporated if it is desired to obtain the crystalline salt. A variety of acids have been used, for example, hydrochloric, acetic, phosphoric and tartaric.

The most suitable method for oxidizing the hydroxy-Schiff's bases has been by the use of aluminum alcoholate-ketone mixture, commonly classified as the Oppenauer method, but other oxidation and dehydrogenation methods for converting the hydroxy group to a keto group may be employed.

The following examples are illustrative of the invention:

Example 1

Ten grams of 3-hydroxy-17-amino-5-androstene was dissolved in 70 cc. of hot ethanol, then to the clear solution was added a mixture of 5 g. of benzaldehyde and 10 cc. of ethanol. After several seconds crystals began to form in the hot solution. The solution was cooled, filtered, and the solid product was dried, yielding 11.1 g. of white crystals of 3-hydroxy-17-benzaldimino-5-androstene, having a melting point of 239–241° C. The mother liquor yielded an additional 0.2 g. of the same product.

Example 2

Ten grams of 3-hydroxy-17-benzaldimino-5-androstene, 30 cc. of cyclohexanone, and 150 cc. of toluene were heated to a clear solution, then a small amount of the solvent was distilled to carry off any trace of moisture that may have been present. Then a solution of 10 g. of aluminum isopropoxide in 100 cc. of hot toluene was added, and the mixture was kept hot over a steam bath for three hours. The mixture was cooled, diluted with ether, washed three times with cold 15% sodium hydroxide, washed three times with water, then the drained ether-toluene layer was steam distilled to remove the ether, toluene and cyclohexanone. The residue after cooling was a suspension of waxy crystals of 3-keto-17-benzaldimino-4-androstene. It may be purified by recrystallization from ether plus alcohol, from which it separates slowly as white crystals melting at 176–178° C.

Example 3

The crude waxy crystals of 3-keto-17-benzaldimino-4-androstene obtained as described above are dissolved in 150 cc. of methanol and treated with 20 cc. of 18% hydrochloric acid. The resulting solution is steam distilled briefly to remove benzaldehyde and part of the methanol, and then the residue is cooled and extracted once with benzene. The resulting water layer is a fairly clean solution of 3-keto-17-amino-4-androstene hydrochloride. It may be used directly for synthetic work, or it may be concentrated under vacuum to a small volume which deposits white granular crystals of the salt. Such concentration must be done carefully so that the residue is not heated excessively with the hydrochloric acid which is often present, because heating with mineral acids causes charring of the keto-amine salts. For this reason it is better practice to prepare the keto-amine acetate, since excess acetic acid does not damage the keto-amine salts.

The pure 3-keto-17-amino-4-androstene hydrochloride is made up of white granular, slightly hygroscopic crystals which decompose when heated.

In an analogous manner, other salts of the keto-amine were obtained by hydrolyzing 3-keto-17-benzaldimino-4-androstene with the appropriate acid. Thus the acetate has been obtained as white crystals which analyze:

Calculated for $C_{21}H_{33}O_3N$: N, 4.03%. Found: N, 4.17%.

Where the purity of the keto-amine salt is of principal concern, it is better of course, to begin the hydrolysis with recrystallized 3-keto-17-benzaldimino-4-androstene.

Example 4

To a hot solution of 10 g. of 3-hydroxy-17-amino-5-androstene in 70 cc. of ethanol was added a hot solution of 5.4 g. of m-nitro-benzaldehyde in 70 cc. of ethanol. Crystals began to form after one minute. After several hours the mixture was filtered and the crystals were washed with methanol and dried. The yield was 14 g. of cream-colored plates of 3-hydroxy-17-(m-nitrobenzaldimino)-5-androstene melting at 198–199° C. and giving the analysis:

Calculated for $C_{26}H_{34}O_3N_2$: C, 73.90; H, 8.11%. Found: C, 73.80; H, 7.96%.

Example 5

A solution of 5.8 g. of 3-hydroxy-17-amino-5-androstene in 100 cc. of hot methanol was treated with a solution of 3.7 g. of p-bromobenzaldehyde in 50 cc. of hot methanol. After several minutes white flakes of the Schiff's base began to separate. After cooling, the product was filtered and washed with methanol, then dried. The 3-hydroxy-17-p-bromobenzaldimino-5-androstene so obtained melted at 252–253° C.

Example 6

Five grams of 3-hydroxy-17-p-bromobenzaldimino-5-androstene was dissolved in 60 cc. of toluene and 20 cc. of cyclohexanone. A small amount of the solvent was distilled to remove traces of moisture, then a solution of 4 g. of aluminum isopropoxide in 25 cc. of hot toluene was added. After three hours heating, the mixture was cooled, diluted with ether, washed with 15% sodium hydroxide and with water, then steam distilled. The cooled residue was a hard yellow wax in water suspension. This crude 3-keto-17-p-bromobenzaldimino-4-androstene may be used directly for further synthesis or it may be crystallized from ether plus methanol, from which it separates as yellow prisms melting at about 193–187° C.

Example 7

Twenty grams of 3-acetoxyternorcholenylamine acetate, obtained, for example, by the Curtius degradation of 3-acetoxybisnorcholenic acid, was dissolved in 200 cc. of ethanol containing 6 g. of potassium hydroxide and 6 cc. of water. About half of the alcohol was distilled from the solution, then the residue was cooled, diluted with ether and the ether layer was washed twice with water to remove the alkali and salts. A solution of 8 cc. of benzaldehyde in 50 cc. of ethanol was added to the ether solution, then ether was distilled slowly until the solution began to crystallize. The Schiff's base separated as white flakes. Recrystallization from benzene plus ethanol gave crystals melting at 191° C. and giving the analysis:

Calculated for $C_{28}H_{39}ON$: C, 82.90; H, 9.69%. Found: C, 82.57; H, 9.31%.

Example 8

A solution of 15 g. of 3-hydroxy-20-benzaldimino-5-pregnene, prepared as described above in Example 7, and 30 cc. of cyclohexanone in 100 cc. of hot toluene was distilled briefly to remove 10 cc. of solvent and a trace of moisture. To the residual hot solution was added 15 g. of aluminum isopropoxide in 50 cc. of hot toluene. The mixture was heated over a steam bath for three hours, then cooled, diluted with ether, washed three times with 15% sodium hydroxide solution, three times with water, and then steam distilled. The residue was a suspension of waxy 3-keto-20-benzaldimino-4-pregnene in water. It may be used directly for further synthesis or it may be purified by crystallization from ether. The recrystallized substance is pale yellow crystals melting at about 199–202° C.

Example 9

Five grams of 3-keto-20-benzaldimino-4-pregnene was dissolved in 20 cc. of 40% acetic acid, then the solution was steam distilled to remove benzaldehyde and acetic acid. The residual clear solution of the keto-amine acetate was concentrated and crystallized from a small volume of water. 3 - keto - 20 - amino - 4-pregnene acetate forms white crystals which melt with decomposition at 220–222° C. and which give the analysis:

Calculated for $C_{23}H_{37}O_3N$: N, 3.73%. Found: N, 3.71%.

In a similar manner 3-keto-20-amino-4-pregnene hydrochloride was obtained as a white crystalline powder which decomposes at about 300° C., and gives the analysis:

Calculated for $C_{21}H_{34}ONCl \cdot \tfrac{1}{2}H_2O$: C, 69.86; H, 9.78%. Found: C, 69.54; H, 10.00%.

The foregoing examples are illustrative of the invention. Various changes and modifications may be made therein without departing from the spirit and scope of the invention. Thus other aromatic aldehydes may be employed for the preparation of the Schiff's bases, and other salts prepared either directly or indirectly from the keto-Schiff's bases. Likewise, other steroid amines may be treated wherein there are other substituent groups on the nucleus, as well as those in which the 17 side chain may contain one or more methylene groups between the 20-carbon atom and the nitrogen, such as the norcholenylamines, cholanylamines and the like.

Having described the invention, what is claimed is:

1. The process which comprises reacting an aromatic aldehyde with a steroid amine having a hydroxy group in the 3-position and a substituent in the 17-position selected from the class consisting of the —$NH_2$ group and alkyl radicals containing an —$NH_2$ group to form a Schiff's base, oxidizing the 3-OH group to a keto group and hydrolyzing the 3-keto-Schiff's base with an acid to form a 3-keto-amine salt.

2. The process of claim 1 in which the substituent in the 17-position of the starting steroid amine is the —$NH_2$ group.

3. The process of claim 1 in which the substituent in the 17-position of the steroid amine is the $$\begin{array}{c}CH_3\\|\\-CH-NH_2\end{array}$$

group

4. The process of claim 1 in which the starting steroid compound is 3-hydroxy-17-amino-$\Delta^5$-androstene.

5. The process of claim 1 in which the starting steroid compound is 3-hydroxy-20-amino-$\Delta^5$-pregnene.

6. The process which comprises oxidizing the 3-hydroxy group of a 3-hydroxy steroid compound having a substituent at the 17-position selected from the class consisting of —N=CHR and —R'N=CHR groups, wherein R is an aromatic group and R' is an alkyl group to a keto group, and hydrolyzing the 3-keto-Schiff's base with acid to form a 3-keto-amine salt.

7. The process of claim 6 in which the substituent group at the 17-position of the 3-hydroxy steroid is a —N=CHR group.

8. The process of claim 6 in which the substituent group at the 17-position of the 3-hydroxy steroid is $$\begin{array}{c}CH\\|\\-CH-N=CHR\end{array}$$

group.

9. The process of claim 6 in which the 3-OH radical is oxidized to the =O radical by treatment with an excess of ketone in the presence of aluminum alkoxide.

10. 3-hydroxy steroid compounds having a substituent group at the 17-position selected from the class consisting of —N=CHR and $$\begin{array}{c}CH_3\\|\\-C-N=CHR\end{array}$$

groups
wherein R is a monocyclic aromatic group.

11. The compounds of claim 10 in which the substituent group at the 17-position is a —N=CHR group.

12. Compounds of the general formula where R is a monocyclic aromatic group.

13. 3-hydroxy-17-benzaldimino-$\Delta^5$-androstene.

14. 3-keto-steroid compounds having a substituent group at the 17-position selected from the class consisting of —N=CHR and $$\begin{array}{c}CH_3\\|\\-C-N=CHR\end{array}$$

groups
wherein R is a monocyclic aromatic group.

15. The compounds of claim 14 in which the substituent group at the 17-position is a —N=CHR group.

16. The compounds of claim 14 in which the substituent group in the 17-position is a $$\begin{array}{c}CH\\|\\-CH-N=CHR\end{array}$$

group.

17. Compounds of the general formula where R is a monocyclic aromatic group.

18. 3-keto-17-benzaldimino-$\Delta^4$-androstene.

19. Compounds of the general formula where R is a monocyclic aromatic group.

20. 3-keto-20-benzaldimino-$\Delta^4$-pregnene.

21. The process of claim 6 in which the acid used is acetic acid.

22. Compounds of the androstene series characterized by (1) the double bond involving the number 5 carbon atom, (2) the presence of an oxygenated substituent at the 3-position of molecular weight less than 18 bonded to the number 3 carbon atom through the oxygen atom, and (3) the presence of a —N=CHR substituent at the 17-position, wherein R is a monocyclic aromatic group.

23. Compounds of the pregnene series characterized by (1) the double bond involving the number 5 carbon atom, (2) the presence of an oxygenated substituent at the 3-position of molecular weight less than 18 bonded to the number 3 carbon atom through the oxygen thereof, and (3) the presence of a —N=CHR substituent at the 20-position wherein R is a monocyclic aromatic group.

24. Compounds of the general formula

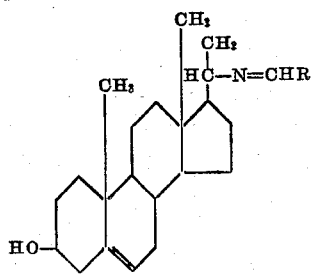

wherein R is a monocyclic aromatic group.

25. 3-hydroxy-20-benzaldimino-Δ⁵-pregnene.

PERCY L. JULIAN.
EDWIN W. MEYER.
JOHN W. COLE.
ARTHUR MAGNANI.

No references cited.